United States Patent
Yamada et al.

(10) Patent No.: US 9,394,979 B2
(45) Date of Patent: Jul. 19, 2016

(54) LINK ACTUATING DEVICE

(71) Applicant: NTN CORPORATION, Osaka (JP)

(72) Inventors: Hiroyuki Yamada, Iwata (JP); Hiroshi Isobe, Iwata (JP); Keisuke Sone, Hamamatsu (JP)

(73) Assignee: NTN CORPORATION, Osaka (JP)

( * ) Notice: Subject to any disclaimer, the term of this patent is extended or adjusted under 35 U.S.C. 154(b) by 83 days.

(21) Appl. No.: 14/355,093

(22) PCT Filed: Nov. 1, 2012

(86) PCT No.: PCT/JP2012/078317
§ 371 (c)(1),
(2) Date: Apr. 29, 2014

(87) PCT Pub. No.: WO2013/069533
PCT Pub. Date: May 16, 2013

(65) Prior Publication Data
US 2014/0305244 A1    Oct. 16, 2014

(30) Foreign Application Priority Data

Nov. 7, 2011  (JP) ................................. 2011-243463

(51) Int. Cl.
*F16H 57/04*     (2010.01)
*B23Q 11/12*    (2006.01)
(Continued)

(52) U.S. Cl.
CPC ................ *F16H 21/46* (2013.01); *B25J 9/0048* (2013.01); *B25J 9/108* (2013.01); *B25J 19/0062* (2013.01);
(Continued)

(58) Field of Classification Search
CPC ......... F16H 21/46; B25J 9/0048; B25J 9/108; B25J 9/0062

USPC ................ 74/490.01, 479.01, 480 R, 490.03, 74/490.05, 467
See application file for complete search history.

(56) References Cited

U.S. PATENT DOCUMENTS

| 5,893,296 | A |   | 4/1999 | Rosheim |
| 6,105,455 | A | * | 8/2000 | Rosheim ............. B25J 17/0266 74/490.03 |

(Continued)

FOREIGN PATENT DOCUMENTS

| CN | 101288953 A | 10/2008 |
| EP | 0 987 087 A2 | 3/2000 |

(Continued)

OTHER PUBLICATIONS

Rolling Bearings for Industrial Robots Takeo Yoda, Nonou Obokata, Shoichi Hioki Taylor & Francis, 1990 (p. 51-52).*

(Continued)

*Primary Examiner* — William Kelleher
*Assistant Examiner* — Joseph Brown

(57) ABSTRACT

A bearing is interposed in the revolute pair between a proximal end side link hub and each proximal side end link member. A control device controls an actuator, to perform work-time control for causing a determined work operation to be executed and to perform, while the work-time control is stopped, grease circulation control for circulating grease sealed in the bearing. The maximum value $\theta_{max}$ of a bending angle in the work-time control does not exceed the maximum allowable bending angle $\theta'_{max}$ being the maximum value of the bending angle allowable in the mechanism, and the maximum value of the bending angle in the grease circulation control is greater than the maximum value $\theta_{max}$ of the bending angle in the work-time control and smaller than the maximum allowable bending angle $\theta'_{max}$.

7 Claims, 10 Drawing Sheets

(51) Int. Cl.
*F16H 21/46* (2006.01)
*B25J 9/00* (2006.01)
*B25J 9/10* (2006.01)
*B25J 19/00* (2006.01)
*F16C 19/06* (2006.01)
*F16C 19/22* (2006.01)
*F16C 33/66* (2006.01)

(52) U.S. Cl.
CPC .............. *F16C 19/06* (2013.01); *F16C 19/22* (2013.01); *F16C 33/6625* (2013.01); *Y10T 74/20207* (2015.01)

(56) References Cited

U.S. PATENT DOCUMENTS

| | | | | |
|---|---|---|---|---|
| 7,472,622 | B2 * | 1/2009 | Isobe | B25J 17/0266 414/729 |
| 7,478,576 | B2 * | 1/2009 | Rosheim | B25J 17/0266 74/490.01 |
| 2005/0199085 | A1 * | 9/2005 | Isobe | B25J 9/0048 74/490.05 |
| 2008/0050059 | A1 * | 2/2008 | Lugt | F16C 33/6614 384/462 |
| 2008/0141813 | A1 * | 6/2008 | Ehrat | B25J 9/103 74/490.01 |
| 2008/0257092 | A1 | 10/2008 | Nihei et al. | |
| 2009/0301253 | A1 * | 12/2009 | Nishida | B25J 9/1623 74/490.01 |
| 2013/0055843 | A1 | 3/2013 | Isobe et al. | |

FOREIGN PATENT DOCUMENTS

| | | |
|---|---|---|
| EP | 1854591 A1 | 11/2007 |
| JP | 2000-94245 | 4/2000 |
| JP | 2005-147333 | 6/2005 |
| JP | 2005-299828 | 10/2005 |
| JP | 2005-305585 | 11/2005 |
| JP | 2008-64056 | 3/2008 |
| JP | 2011-240440 | 12/2011 |

OTHER PUBLICATIONS

International Preliminary Report on Patentability mailed Jun. 12, 2014 in corresponding International Patent Application No. PCT/JP2012/078317.
International Search Report mailed Dec. 18, 2012 in corresponding International Patent Application No. PCT/JP2012/078317.
Chinese Office Action mailed Dec. 31, 2015 in related Chinese Application No. 201280054395.2.

* cited by examiner

LINK ACTUATING DEVICE

CROSS-REFERENCE TO RELATED APPLICATIONS

This application is a U.S. national stage application of PCT/JP2012/078317 filed Nov. 1, 2012 and claims foreign priority benefit of Japanese Patent Application No. 2011-243463 filed Nov. 7, 2011 in the Japanese Intellectual Property Office, the contents of which are incorporated herein by reference.

BACKGROUND OF THE INVENTION

1. Field of the Invention

The present invention relates to a link actuating device which is used in a device such as a medical device, an industrial device, or the like which is required to operate in a precise and wide operating range in a three-dimensional space.

2. Description of Related Art

One example of a working device equipped with a parallel link mechanism is disclosed in JP Patent Publication No. 2000-94245, and one example of a link actuating device used in a medical device, an industrial device, or the like is disclosed in U.S. Pat. No. 5,893,296.

In the parallel link mechanism of JP Patent Publication No. 2000-94245, the operating angle of each link is small. Therefore, in order to increase the operating range of the travelling plate, the parallel link mechanism is required to have an increased link length. Accordingly, a problem has been found that the dimensions of the mechanism as a whole increase and the apparatus tends to be bulky in size. Also, if the link length is increased, the rigidity of the mechanism as a whole tends to be lowered. For this reason, there has also been a problem that the weight of a tool mounted on the travelling plate, that is, the weight capacity of the travelling plate, is limited to a small value. For these reasons, it is difficult to use the parallel link mechanism in a medical device or the like which requires the parallel link mechanism to be compact in size and to operate in a precise and wide operating range.

The link actuating device of U.S. Pat. No. 5,893,296 includes three or more trinodal chain link mechanisms, thereby being able to operate in a precise and wide operating range, although the link actuating device is compact in size. However, in the above configuration, since each revolute pair section of the link mechanism oscillates, the lives or life-time of the bearings provided in the revolute pair section may be reduced depending on its operating range.

SUMMARY OF THE INVENTION

An object of the present invention is to provide a link actuating device which can, despite its compactness in size, operate in a precise and wide operating range and realize long lives of bearings provided in the revolute pair sections.

The link actuating device of the present invention is a link actuating device including: a proximal end side link hub; a distal end side link hub; and three or more link mechanisms which connect the distal end side link hub to the proximal end side link hub such that alteration in posture is allowed, wherein each of the link mechanisms includes: a proximal side end link member having one end rotatably connected to the proximal end side link hub; a distal side end link member having one end rotatably connected to the distal end side link hub; and an intermediate link member having one end and the other end rotatably connected to the other ends of the proximal side end link member and the distal side end link member, respectively, wherein each of the link mechanisms has such a shape that a geometric model of the link mechanism depicted in lines shows symmetry between a proximal end side portion thereof and a distal end side portion thereof with respect to an intermediate portion of the intermediate link member, and wherein at least two or more link mechanisms among the three or more link mechanisms are each provided with an actuator which arbitrarily alters a posture of the distal end side link hub relative to the proximal end side link hub.

In the above configuration, a revolute pair between the proximal end side link hub and the one end of the proximal side end link member, a revolute pair between the distal end side link hub and the one end of the distal side end link member, a revolute pair between the other end of the proximal side end link member and the one end of the intermediate link, and a revolute pair between the other end of the distal side end link member and the other end of the intermediate link each have a bearing interposed therein; a control device which controls the actuator is provided, the control device performing work-time control for causing a determined work operation to be executed and performing, while the work-time control is stopped, grease circulation control for circulating grease sealed in the bearing; and a maximum value of a bending angle, in the work-time control, being an angle between a central axis of the proximal end side link hub and a central axis of the distal end side link hub does not exceed a maximum allowable bending angle being a maximum value of the bending angle allowable in each mechanism, and a maximum value of the bending angle in the grease circulation control is greater than the maximum value of the bending angle in the work-time control and smaller than the maximum allowable bending angle.

According to this feature, the proximal end side link hub, the distal end side link hub, and the three or more link mechanisms form a two-degrees-of-freedom mechanism in which the distal end side link hub is movable in two axial directions perpendicular to each other relative to the proximal end side link hub. In other words, the mechanism allows the distal end side link hub to rotate with two degrees of freedom so as to alter its posture relative to the proximal end side link hub. This two-degrees-of-freedom mechanism is compact in size, but can realize a wide range of movement of the distal end side link hub relative to the proximal end side link hub. For example, the bending angle between the central axis of the proximal end side link hub and the central axis of the distal end side link hub is about ±90° at maximum, and an angle of traverse of the distal end side link hub relative to the proximal end side link hub can be set within a range of 0° to 360°.

With respect to at least two among the three or more link mechanisms, if the angle of rotation of the proximal side end link member is determined, the posture of the distal end side link hub relative to the proximal end side link hub is also determined. Thus, by providing an actuator to each of the two or more link mechanisms among the three or more link mechanisms, and appropriately controlling each actuator, the posture of the distal end side link hub can be arbitrarily altered relative to the proximal end side link hub.

Moreover, by interposing the bearing in each revolute pair, the frictional resistance in each revolute pair can be reduced, whereby the rotational resistance can be relieved. Accordingly, a smooth power transmission can be secured, and also the durability of each of the revolute pairs can be increased. Since each revolute pair oscillates, repetition of operation within the range of oscillation may cause poor grease lubrication in that portion. During work stopped, if grease circulation control is performed with the maximum value of the bending angle set to be greater than the maximum value of the bending angle in the work-time control and to be smaller than the maximum allowable bending angle, during work grease accumulated at sites outside the range of oscillation of the bearing can be returned to within the range of oscillation. Accordingly, occurrence of poor lubrication in the bearing can be prevented and a long life of the bearing can be realized.

In the present invention, in the grease circulation control, the actuator may be controlled so as to cause the distal end side link hub to swing relative to the proximal end side link hub while the bending angle is maintained to be greater than the maximum value of the bending angle in the work-time control. In this case, due to the structure of the link actuating device, each bearing disposed in each revolute pair will move in the range of oscillation or greater of the bearing. Thus, grease accumulated at sites outside the range of oscillation of the bearing can be more effectively returned to within the range of oscillation during work.

In the present invention, as the bearing, a bearing whose critical oscillation angle is smaller than the maximum value of the bending angle in the work-time control may be used. It should be noted that the critical oscillation angle above is a minimum oscillation angle allowable in a bearing, and means a minimum oscillation angle that can provide a specification or a rated life of the bearing. Due to the structure of the link actuating device, the bearing of each revolute pair oscillates. If the oscillation angle of the bearing is small, the life of the bearing under oscillation is rendered to be long, but if the oscillation angle is reduced to some level or lower, fretting is caused and the bearing reaches the end of life early. If critical oscillation angle of the bearing to be interposed in the revolute pair is smaller than the maximum value of the bending angle in the work-time control, a long life of the bearing can be realized. The basis thereof is described below.

In a case where the angle of rotation of the proximal side end link member relative to the proximal end side link hub is $\beta n$, the angle between the one connection end axis of the intermediate link member rotatably connected to the proximal side end link member and the other connection end axis of the intermediate link member rotatably connected to the distal side end link member is $\gamma$, the angle of spacing in the circumferential direction of each proximal side end link member relative to a proximal side end link member that serves as a reference is $\delta n$, the bending angle being a vertical angle formed when the central axis of the distal end side link hub is inclined relative to the central axis of the proximal end side link hub is $\theta$, and the angle of traverse being a horizontal angle formed when the central axis of the distal end side link hub is inclined relative to the central axis of the proximal end side link hub is $\phi$, the following relationship is established.

$$\cos(\theta/2)\sin \beta n - \sin(\theta/2)\sin(\phi + \delta n)\cos \beta n + \sin(\gamma/2) = 0 \quad \text{(equation 1)}$$

In equation 1, from a change amount of the angle of rotation $\beta n$ obtained when the angle of traverse $\phi$ is changed while the maximum value of the bending angle $\theta$ in the work-time control is $\theta_{max}$, the range of oscillation of the proximal side end link member relative to the proximal end side link hub and the range of oscillation of the distal side end link member relative to the distal end side link hub are obtained. Each obtained range of oscillation is $\theta_{max}$. On the other hand, the range of oscillation of the intermediate link member relative to each of the proximal and distal side end link members is rendered to be greater than $\theta_{max}$ due to the structure of the parallel link mechanism. Therefore, with respect to the bearing of each revolute pair, if the critical oscillation angle $\eta$ is set to be smaller than or equal to $\theta_{max}$, every bearing will be driven at the critical oscillation angle $\eta$ or greater, whereby a long life of the bearing can be realized.

As the bearing, a bearing whose critical angle is greater than the maximum value of the bending angle in the work-time control and smaller than the maximum allowable bending angle may be used. In this case, the link actuating device can perform operation in a precise and wide operating range despite its compactness in size, and also, a long life of the bearing interposed in each revolute pair can be realized.

The bearing may be a deep groove ball bearing, and when the number of rolling elements of the deep groove ball bearing is Z, the critical oscillation angle of the bearing may be set to be $2 \times 180/(0.555 Z\pi)[\deg]$. The value of the critical oscillation angle determined as described above substantially matches the optimum value of the critical oscillation angle obtained from experimental data.

The bearing may be a cylindrical roller bearing, and when the number of rolling elements in the cylindrical roller bearing is Z, the critical oscillation angle of the bearing may be set to be $2 \times 180/(0.37(Z+0.1)\pi)[\deg]$. The value of the critical oscillation angle determined as described above substantially matches the optimum value of the critical oscillation angle obtained from experimental data.

The bearing may be a needle roller bearing, and when the number of rolling elements in the needle roller bearing is Z, the critical oscillation angle of the bearing may be set to be $2 \times 180/(0.544 Z\pi)[\deg]$. The value of the critical oscillation angle determined as described above substantially matches the optimum value of the critical oscillation angle obtained from experimental data.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Figure 1:
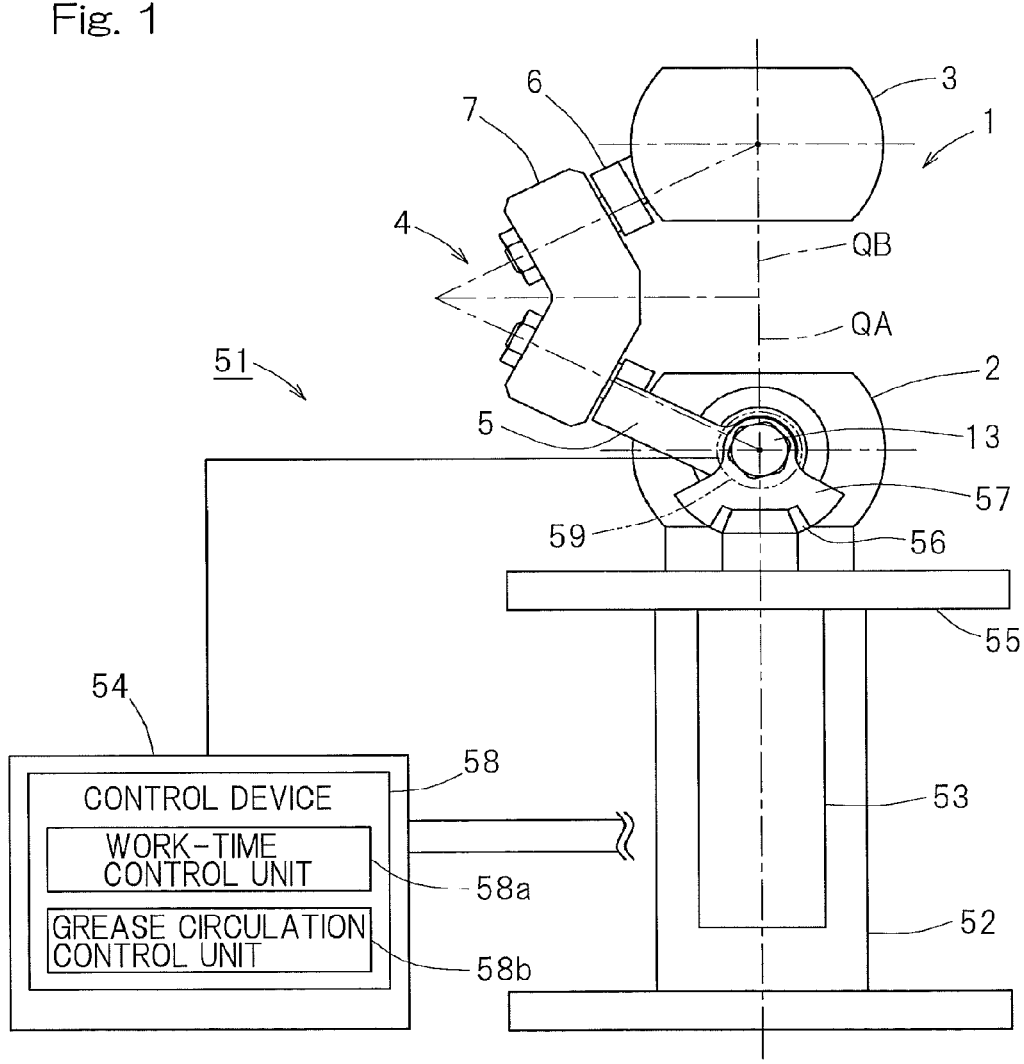
FIG. 1 is a front view of a link actuating device, with a portion thereof omitted, according to a first embodiment of the present invention.

A link actuating device according to a first embodiment of the present invention will be described with reference to FIG. 1 to FIG. 9. As shown in FIG. 1, this link actuating device 51 includes a parallel link mechanism 1, a base 52 which supports the parallel link mechanism 1, two or more actuators 53 which cause the parallel link mechanism 1 to operate, and a control device 58 which controls these actuators 53. In this example, the control device 58 is provided in a controller 54, but the control device 58 may be provided separately from the controller 54.

Figure 2:
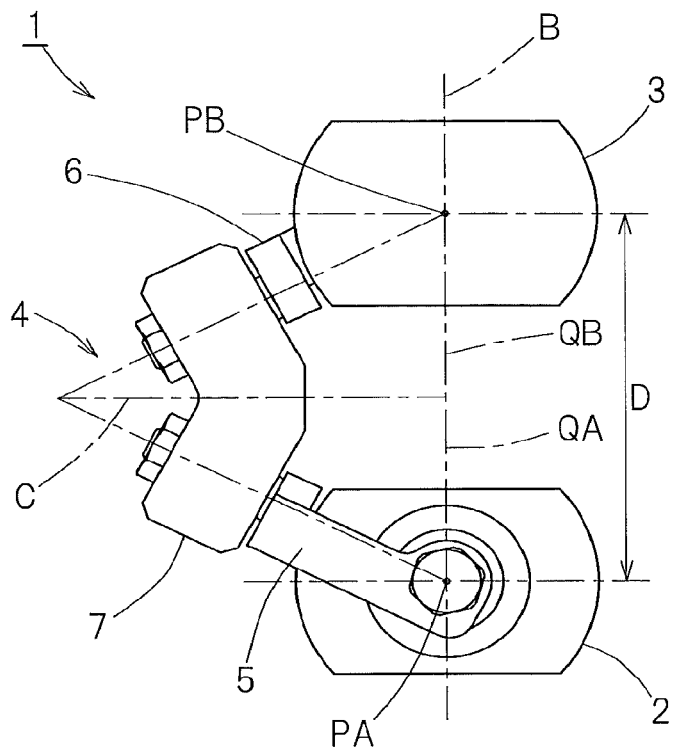
FIG. 2 is a front view showing a state of a parallel link mechanism, with a portion thereof omitted, of the link actuating device.
Figure 3:
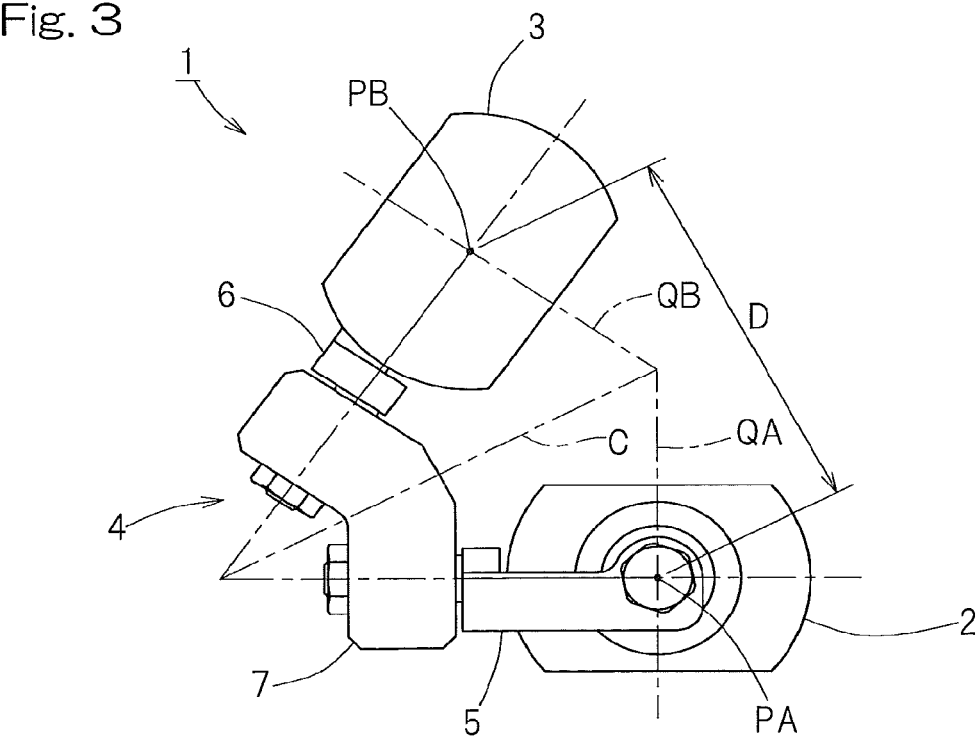
FIG. 3 is a front view showing a different state of the parallel link mechanism, with a portion thereof omitted, of the link actuating device.

At first, the parallel link mechanism 1 is described. FIG. 2 and FIG. 3 are front views respectively showing different states of the parallel link mechanism. The parallel link mechanism 1 is of a type in which a distal end side link hub 3 is connected to a proximal end side link hub 2 via three link mechanisms 4 such that alteration in posture is allowed. FIG. 2 and FIG. 3 show only one link mechanism 4.

Figure 4:
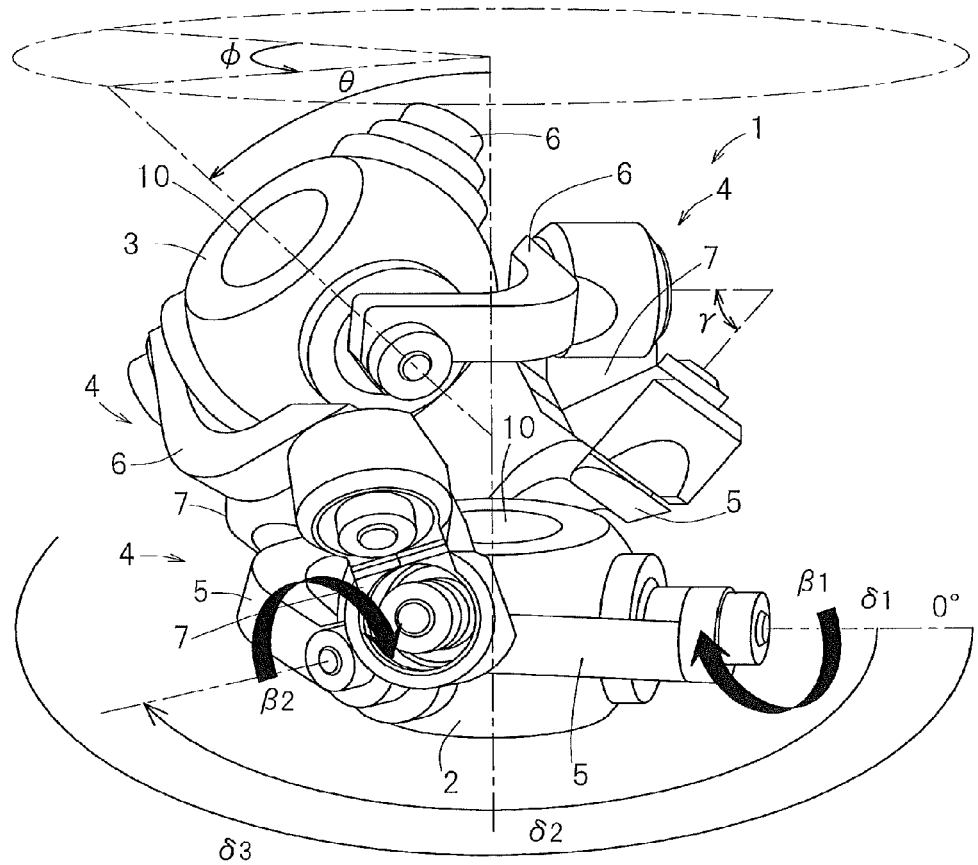
FIG. 4 is a perspective view showing a three-dimensional representation of the parallel link mechanism.

FIG. 4 is a perspective view showing a three-dimensional representation of the parallel link mechanism 1. Each link mechanism 4 includes a proximal side end link member 5, a distal side end link member 6, and an intermediate link member 7, and forms a trinodal chain link mechanism including four revolute pairs. The proximal side and distal side end link members 5 and 6 form an L-shape. A proximal end of the proximal side end link member 5 is rotatably connected to the proximal end side link hub 2, and a proximal end of the distal side end link member 6 is rotatably connected to the distal end side link hub 3. The intermediate link member 7 has its opposite ends connected rotatably with a distal end of the proximal side end link member 5 and a distal end of the distal side end link member 6.

The proximal side and distal side end link members 5 and 6 each have a spherical link structure. Spherical link centers PA and PB (FIG. 2, FIG. 3) are in common among the three link mechanisms 4, and the distance between the spherical link centers PA and PB is also the same among the three link mechanisms 4. The central axis of the revolute pair between the proximal side end link member 5 and the intermediate link member 7 and the central axis of the revolute pair between the distal side end link member 6 and the intermediate link member 7 may form an angle or may be parallel to each other.

Figure 5:
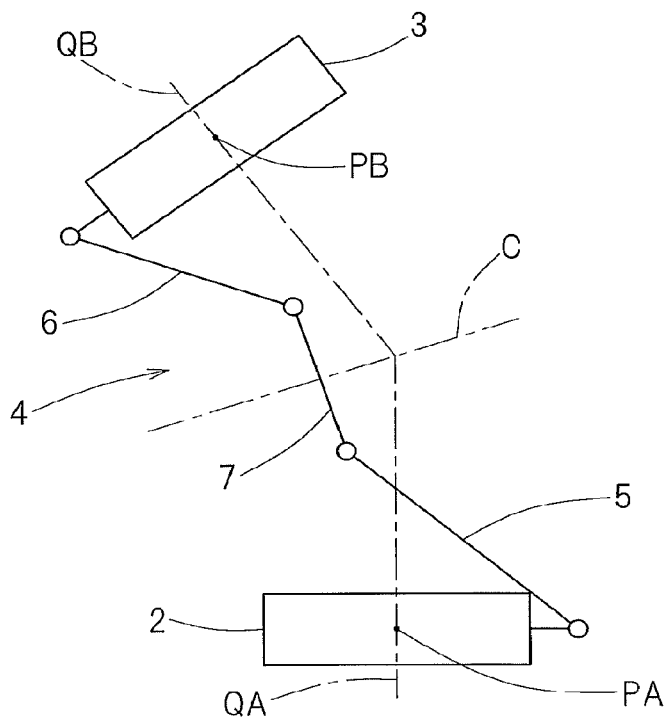
FIG. 5 is a diagram showing one link mechanism depicted in lines of the parallel link mechanism.

In other words, the three link mechanisms 4 have a geometrically identical configuration. The geometrically identical configuration means that a geometric model depicted in lines representing the respective link members 5, 6, and 7, that is, a model depicted with the four revolute pairs and lines connecting these four revolute pairs, represents a shape in which a proximal end side portion and a distal end side portion are symmetrical with each other with respect to an intermediate portion of the intermediate link member 7. FIG. 5 is a diagram showing one link mechanism 4 depicted in lines.

The link mechanism 4 of the first embodiment is of a rotation symmetrical type, and employs a positional structure in which the positional relationship between a proximal end side group of the proximal end side link hub 2 and the proximal side end link member 5 and a distal end side group of the distal end side link hub 3 and the distal side end link member 6, is in rotational symmetry relative to a center line C of the intermediate link member 7. FIG. 2 shows a state where a central axis QA of the proximal end side link hub 2 and a central axis QB of the distal end side link hub 3 are on the same line, and FIG. 3 shows a state where the central axis QB of the distal end side link hub 3 has a predetermined operating angle relative to the central axis QA of the proximal end side link hub 2. Even when the posture of each link mechanism 4 changes, the distance D between the spherical link center PA on the proximal end side and the spherical link center PB on the distal end side does not change.

The proximal end side link hub 2, the distal end side link hub 3, and the three link mechanisms 4 construct a two-degrees-of-freedom mechanism in which the distal end side link hub 3 is movable in two axial directions perpendicular to each other relative to the proximal end side link hub 2. In other words, the mechanism allows the distal end side link hub 3 to rotate with two degrees of freedom to alter its posture, relative to the proximal end side link hub 2. This two-degrees-of-freedom mechanism is compact in size, but can realize a wide range of movement of the distal end side link hub 3 relative to the proximal end side link hub 2. For example, the maximum value of a bending angle (maximum bending angle) θ between the central axis QA of the proximal end side link hub 2 and the central axis QB of the distal end side link hub 3 can be set to be about ±90°. Moreover, an angle of traverse φ of the distal end side link hub 3 relative to the proximal end side link hub 2 can be set within a range of 0° to 360°. The bending angle θ means a vertical angle formed when the central axis QB of the distal end side link hub 3 is inclined relative to the central axis QA of the proximal end side link hub 2. The angle of traverse φ means a horizontal angle formed when the central axis QB of the distal end side link hub 3 is inclined relative to the central axis QA of the proximal end side link hub 2.

With respect to the parallel link mechanism 1, in a case where the angles and the lengths of shaft members 13 (FIG. 6) of the proximal side and distal side end link members 5 and 6 of each link mechanism 4 are identical with each other, the geometrical shapes of the proximal side end link member 5 and the distal side end link member 6 are identical with each other, and the shapes at a proximal end side and a distal end side of the intermediate link member 7 are identical with each other, it is assumed that the angular positional relationship between the intermediate link member 7 and the proximal side end link member 5 and the angular positional relationship between the intermediate link member 7 and the distal side end link member 6 are rendered to be identical with each other relative to the symmetry plane of the intermediate link member 7, between the proximal end side and the distal end side. Then, due to geometric symmetry, the proximal end side group of the proximal end side link hub 2 and the proximal side end link member 5, and the distal end side group of the distal end side link hub 3 and the distal side end link member 6 will move in the same manner. For example, in a case where rotation shafts are provided in the proximal end side and distal end side link hubs 2 and 3 in a manner coaxial with the central axes QA and QB, respectively, and rotation transmission is made from the proximal end side to the distal end side, a constant velocity universal joint is formed in which the proximal end side and the distal end side rotate by the same angle of rotation at an equal speed. The symmetry plane of the intermediate link member 7 at the time of the constant speed rotation is known as a constant velocity bisecting plane.

Therefore, by circumferentially arranging a plurality of the link mechanisms 4 having the same geometric shape and commonly using the proximal end side link hub 2 and the distal end side link hub 3, as positions that allow compatible movement of the plurality of the link mechanisms 4, the intermediate link members 7 are limited to move on their respective constant velocity bisecting planes. Accordingly, even when the proximal end side and the distal end side assume an arbitrary operating angle, the proximal end side and the distal end side rotate at a constant speed.

Each of the proximal end side link hub 2 and the distal end side link hub 3 has a through-hole 10 formed in a center portion thereof and extending along the axial direction thereof, and is formed in a doughnut shape with a spherical external shape. The three proximal side end link members 5 and the three distal side end link members 6 are respectively rotatably connected to the outer peripheral faces of the proximal end side link hub 2 and the distal end side link hub 3, at equal intervals in the circumferential direction thereof.

Figure 6:
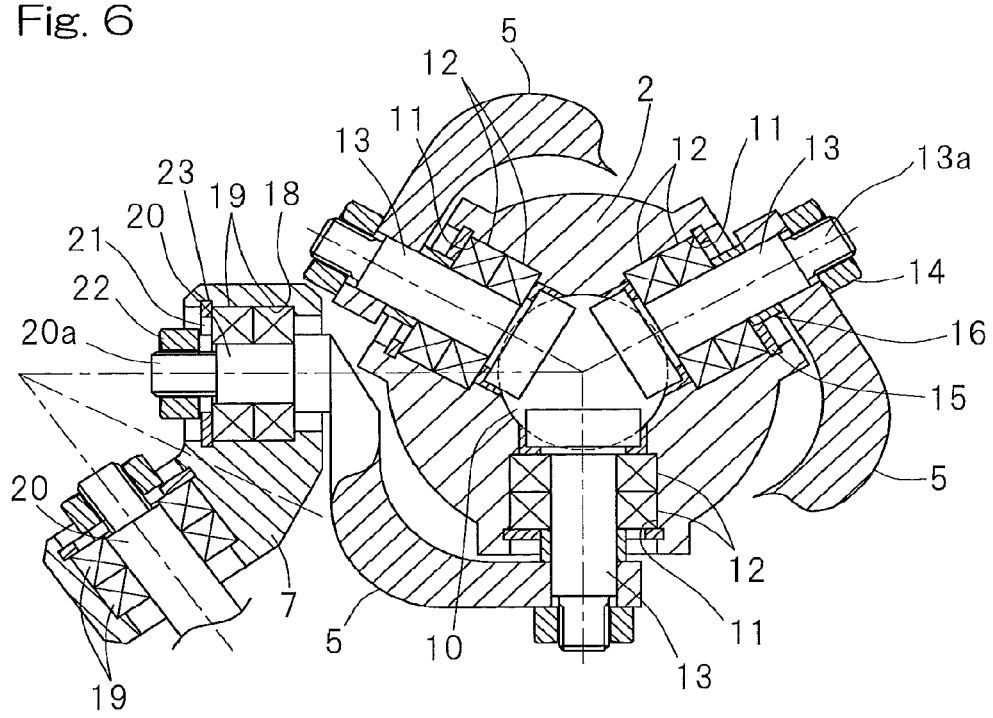
FIG. 6 is a sectional view of a portion of the parallel link mechanism.

FIG. 6 is a cross-sectional view showing a revolute pair section between the proximal end side link hub 2 and the proximal side end link member 5, and a revolute pair section between the proximal side end link member 5 and the intermediate link member 7. In the proximal end side link hub 2, communication holes 11 extending in radial directions are formed at three positions in the circumferential direction of the proximal end side link hub 2, each communication hole 11 allowing the through-hole 10 extending in the axial direction to communicate with the outer periphery of the proximal end side link hub 2. Double row bearings 12 are provided in each communication hole 11 and rotatably support the shaft member 13. The shaft member 13 has an outer end portion provided with a protruding screw portion 13$a$ protruding from the outer periphery surface of the proximal end side link hub 2, and the proximal side end link member 5 is coupled to the protruding screw portion 13$a$, and fixedly fastened with a nut 14.

Each bearing 12 is a rolling bearing such as, for example, a deep groove ball bearing, and has an outer ring (not shown) fitted on the inner periphery of the communication hole 11 and an inner ring (not shown) fitted on the outer periphery of the shaft member 13. The outer ring is prevented from slipping off by a retaining ring 15. Between the inner ring and the proximal side end link member 5, a spacer 16 is interposed, and thus, the fastening force of the nut 14 is transmitted to the inner ring via the proximal side end link member 5 and the spacer 16, thereby applying a predetermined preload to the bearing 12.

In the revolute pair section between the proximal side end link member 5 and the intermediate link member 7, double row bearings 19 are provided in a communication hole 18, which is one of those respectively formed on opposite ends of the intermediate link member 7, and these bearings 19 rotatably support a shaft portion 20 fixed to the distal end of the proximal side end link member 5. The bearings 19 are fixedly fastened with a nut 22 via a spacer 21.

Each bearing 19 is a rolling bearing such as, for example, a deep groove ball bearing, and has an outer ring (not shown) fitted on the inner periphery of the communication hole 18, and an inner ring (not shown) fitted on the outer periphery of the shaft portion 20. The outer ring is prevented from slipping off by a retaining ring 23. The fastening force of the nut 22 threadedly engaged on a distal end screw portion 20$a$ of the shaft portion 20 is transmitted to the inner ring via the spacer 21, thereby applying a predetermined preload to the bearing 19.

The revolute pair section between the proximal end side link hub 2 and the proximal side end link member 5, and the revolute pair section between the proximal side end link member 5 and the intermediate link member 7 have been described above. The revolute pair section between the distal end side link hub 3 and the distal side end link member 6, and the revolute pair section between the distal side end link member 6 and the intermediate link member 7 have the same configuration as above (not shown).

As described above, the bearings 12, 19 are interposed in four revolute pairs in each link mechanism 4, in other words, in a revolute pair between the proximal end side link hub 2 and the proximal side end link member 5, in a revolute pair between the distal end side link hub 3 and the distal side end link member 6, in a revolute pair between the proximal side end link member 5 and the intermediate link member 7, and in a revolute pair between the distal side end link member 6 and the intermediate link member 7. By employing this structure, the frictional resistance occurring in each revolute pair can be reduced, whereby the rotational resistance can be relieved. Accordingly, a smooth power transmission can be secured, and also, the durability thereof can be increased.

Further, by applying a preload to the bearings 12, 19, a radial clearance and a thrust clearance are eliminated and rattling of the revolute pair can be suppressed. Moreover, rotation phase difference between the proximal end side link hub 2 side and the distal end side link hub 3 side is eliminated, and as a result, constant velocity can be maintained and occurrence of vibration and abnormal sound can be suppressed. In particular, by providing the bearing clearance in each bearing 12, 19 as a negative clearance, backlash occurring between an input and an output can be reduced.

By providing each bearing 12 embedded in the proximal end side link hub 2 and the distal end side link hub 3, without enlarging the external shape of the entirety of the parallel link mechanism 1, the external shape of each of the proximal end side link hub 2 and the distal end side link hub 3 can be enlarged. Accordingly, the mounting space for mounting the proximal end side link hub 2 and the distal end side link hub 3 to other members can be easily secured.

Figure 7:
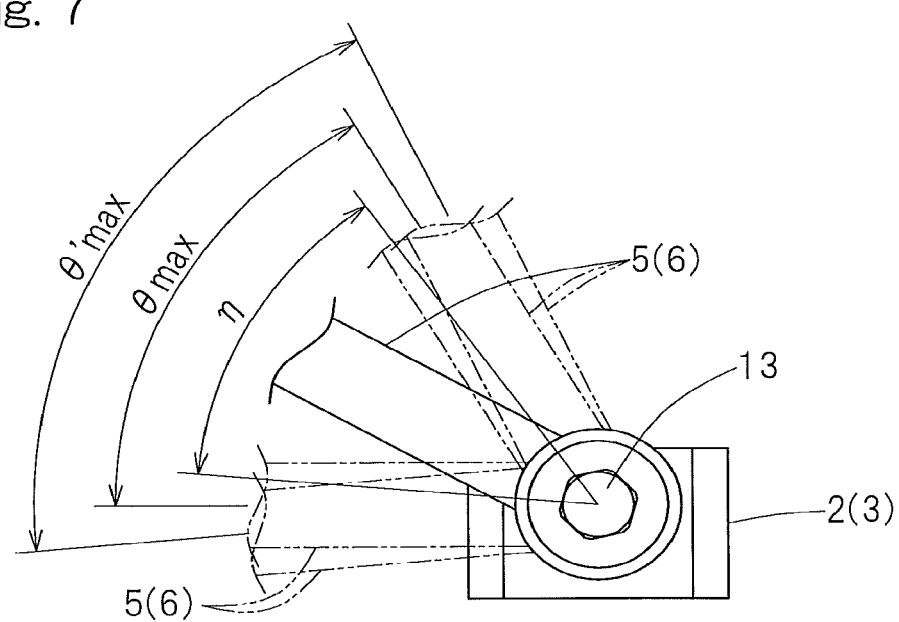
FIG. 7 shows a relationship between a range of movement and a critical oscillation angle in an end link member.
Figure 8:
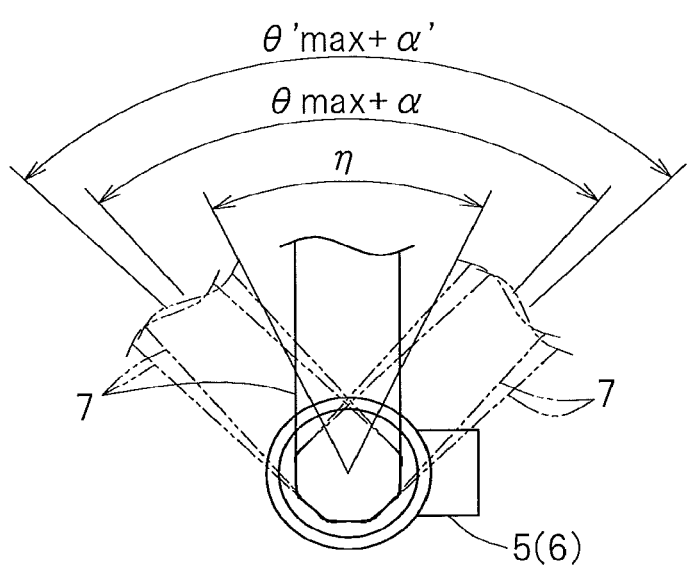
FIG. 8 shows a relationship between a range of movement and a critical oscillation angle in an end link member.

Due to the structure of the parallel link mechanism 1, each bearing 12, 19 in each revolute pair section oscillates. If the oscillation angle of the bearing is small, the life of the bearing under oscillation is rendered to be long, but if the oscillation angle is reduced to some level or lower, fretting is caused and the bearing reaches the end of life early. Therefore, in order to realize a long life of each bearing 12, 19 arranged in each revolute pair section, as shown in FIG. 7 and FIG. 8, as each of the bearings 12, 19, a bearing is used whose critical oscillation angle η, which is the minimum oscillation angle allowable in a bearing, is smaller than the maximum value (maximum bending angle) $θ_{max}$ of the bending angle θ between the central axis QA of the proximal end side link hub 2 and the central axis QB of the distal end side link hub 3 during work-time control for causing a determined work operation to be executed. The basis thereof is described below.

In a case where the angle of rotation of the proximal side end link member 5 relative to the proximal end side link hub 2 is βn, the angle between one connection end axis of the intermediate link member 7 rotatably connected to the proximal side end link member 5 and the other connection end axis of the intermediate link member 7 rotatably connected to the distal side end link member 6 is γ, the angle of spacing in the circumferential direction of each proximal side end link member 5 relative to a proximal side end link member 5 that serves as a reference is δn, the bending angle being a vertical angle formed when the central axis QB of the distal end side link hub 3 is inclined relative to the central axis QA of the proximal end side link hub 2 is θ, and the angle of traverse being a horizontal angle formed when the central axis QB of the distal end side link hub 3 is inclined relative to the central axis QA of the proximal end side link hub 2 is φ, the following relationship is established.

$$\cos(\theta/2)\sin\beta n - \sin(\theta/2)\sin(\phi+\delta n)\cos\beta n + \sin(\gamma/2) = 0 \quad \text{(equation 1)}$$

In equation 1 above, from a change amount of the angle of rotation βn obtained when the angle of traverse φ is changed with the maximum bending angle being $\theta_{max}$, the range of oscillation of the proximal side end link member 5 relative to the proximal end side link hub 2 and the range of oscillation of the distal side end link member 6 relative to the distal end side link hub 3 are obtained. Each obtained range of oscillation is $\theta_{max}$ (FIG. 7). On the other hand, the range of oscillation of the intermediate link member 7 relative to each of the proximal and distal side end link members 5, 6 is rendered to be greater than $\theta_{max}$ (FIG. 8) due to the structure of the parallel link mechanism 1. Therefore, with respect to the bearing 12, 19 of each revolute pair section, if the critical oscillation angle η is set to be smaller than or equal to $\theta_{max}$, every bearing 12, 19 will be driven at the critical oscillation angle η or greater, whereby a long life of the bearing 12, 19 can be realized.

Further, a supplementary explanation of the critical oscillation angle η is given. When the oscillation angle of a bearing is very small, an oil film is difficult to be formed on the contact surfaces between the bearing rings and the rolling elements, which may cause fretting (fretting corrosion). The critical oscillation angle η in the case of inner ring oscillation is expressed by equation 2.

$$\eta \geq (360/Z)(d_p/(d_p - D_p \cos\alpha)) \quad \text{(equation 2)}$$

Z: the number of rolling elements (per row)
$d_p$: pitch circle diameter of rolling element
$D_p$: rolling element diameter
α: contact angle In the case of outer ring oscillation, the right side denominator is $(d_p + D_p \cos\alpha)$.

Figure 9:
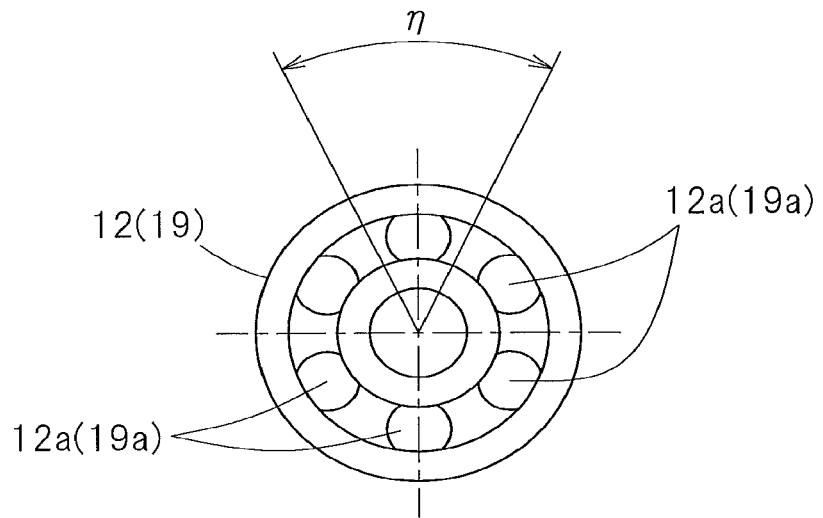
FIG. 9 shows a critical oscillation angle of a bearing.

Specifically, in a case where the bearing 12 (19) is a deep groove ball bearing as shown in FIG. 9, when the number of rolling elements 12a (19a) of the deep groove ball bearing is Z, the critical oscillation angle η is set to be 2×180/(0.555 Zπ)[deg]. In a case where the bearing 12 (19) is a cylindrical roller bearing (not shown), when the number of rolling elements of the cylindrical roller bearing is Z, the critical oscillation angle η is set to be 2×180/(0.37(Z+0.1)π[deg]. In a case where the bearing 12 (19) is a needle roller bearing (not shown), when the number of rolling elements of the needle roller bearing is Z, the critical oscillation angle η is set to be 2×180/(0.544 Zπ)[deg]. The values of the critical oscillation angle determined as described above substantially match optimum values of the critical oscillation angle η obtained from experimental data.

With reference to FIG. 1, the base 52 is a member long in the vertical direction, and the proximal end side link hub 2 of the parallel link mechanism 1 is fixed to the top face of the base 52. The outer periphery of an upper portion of the base 52 is provided with a drive source mounting base 55 having a collar shape. The actuators 53 are mounted to this drive source mounting base 55 so as to be suspended therefrom. The number of the actuators 53 is two, for example. Each actuator 53 is implemented by a rotary actuator, and includes a bevel gear 56 mounted on the output shaft of the actuator 53 and a bevel gear 57 having a sector shape mounted on the shaft member 13 (FIG. 6) of the proximal end side link hub 2, with the respective bevel gears 56 and 57 being meshed with each other.

In the link actuating device 51, the control device 58 controls each actuator 53, thereby causing the parallel link mechanism 1 to operate. In detail, when the actuator 53 is driven to rotate as a result of control by the control device 58, its rotation is transmitted to the shaft member 13 via a pair of the bevel gears 56 and 57, whereby the angle of the proximal side end link member 5 relative to the proximal end side link hub 2 is altered. Accordingly, the position and posture of the distal end side link hub 3 are determined. Two or more actuators 53 are necessary in order to determine the position and posture of the distal end side link hub 3 relative to the proximal end side link hub 2. Therefore, the number of the link mechanisms 4, in which the actuators 53 are respectively provided, is set to be two or more. The actuators 53 may be provided to all of the three link mechanisms 4.

The control device 58 is of a type capable of being numerically controlled by a computer, and includes a work-time control unit 58a and a grease circulation control unit 58b. The work-time control unit 58a causes each actuator 53 to execute the determined work operation. The grease circulation control unit 58b causes, while the work-time control is stopped, the actuator 53 to operate so as to circulate grease sealed in each bearing 12, 19.

The work-time control is performed in accordance with a command given by, for example, a setting instrument (not shown) or an operation tool (not shown) provided in the controller 54. The work operation to be executed may be the same for each command, or may be different for each command. The maximum value (maximum bending angle) $\theta_{max}$ of the bending angle θ of the link actuating device 51 in this work-time control is, as shown in FIG. 7, set so as not to exceed a maximum allowable bending angle $\theta'_{max}$ being the maximum value of the bending angle θ allowable in the mechanism. As described above, the maximum bending angle $\theta_{max}$ is greater than the critical oscillation angle η of the bearing 12, 19.

It should be noted that FIG. 7 shows that the maximum value $\theta_{max}$ of the bending angle θ is expressed in terms of the angle of rotation of the proximal side end link member 5, based on the relationship between the bending angle θ and the range of oscillation of the proximal side end link member 5 relative to the proximal end side link hub 2. In a case where the maximum value of the bending angle θ and the maximum allowable bending angle are expressed in terms of the angle of rotation of the intermediate link member 7 based on the relationship between the bending angle θ and the range of oscillation of the intermediate link member 7 relative to the proximal side end link member 5, as shown in FIG. 8, the maximum value of the bending angle θ is $\theta_{max}+\alpha$, and the maximum allowable bending angle is $\theta'_{max}+\alpha'$.

The grease circulation control is carried out in accordance with a starting operation performed by an operator, and causes the same operation to be performed every time. For example, the distal end side link hub 3 is caused to swing relative to the proximal end side link hub 2. The maximum value of the bending angle θ in this grease circulation control is set to be greater than the maximum value $\theta_{max}$ of the bending angle θ in the work-time control and to be smaller than the maximum allowable bending angle $\theta'_{max}$. Therefore, in a case where the distal end side link hub 3 is to be swung relative to the proximal end side link hub 2 as mentioned above, the distal end side link hub 3 is caused to swing while the bending angle θ is maintained to be greater than the maximum value $\theta_{max}$ of the bending angle θ in the work-time control.

Since each revolute pair of the link actuating device 51 oscillates, repetition of operation within the range of oscillation causes poor grease lubrication in that portion. When grease circulation operation by the grease circulation control is performed while work of the link actuating device 51 is stopped, grease that has accumulated at sites outside the range of oscillation of the bearing can be returned to within the range of oscillation during work. Accordingly, occurrence of poor lubrication in the bearing can be prevented and a long life of the bearing can be realized. The grease circulation operation may be performed, for example, once a day or once a week.

Figure 10:
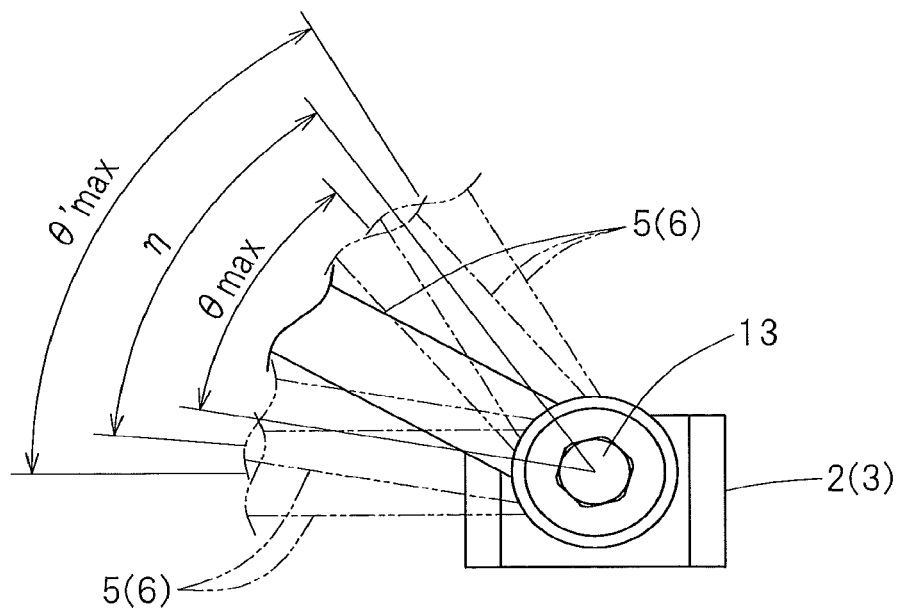
FIG. 10 shows a different relationship between a range of movement and a critical oscillation angle in an end link member.

In the example shown in FIG. 7, the maximum bending angle $\theta_{max}$ during the work control is greater than the critical oscillation angle η of the bearing 12, 19. However, as shown in FIG. 10, the maximum bending angle $\theta_{max}$ may be set to be smaller than the critical oscillation angle η. That is, a relationship of $\theta_{max} \leq \eta \leq \theta'_{max}$ may be employed. In this case, even if the bearing 12, 19 moves within the range of the critical oscillation angle η during the work, the bearing 12, 19 will move in the critical oscillation angle η or greater in the grease circulation operation. Thus, the life of the bearing is prevented from being reduced.

Control of each actuator 53 performed by the control device 58 is described in detail. First, in accordance with a target posture of the distal end side link hub 3, a control target value of the angle of rotation βn of the proximal side end link member 5 is calculated. The angle of rotation βn above means the operating position of the actuator 53. The calculation of the angle of rotation βn is carried out by inverse transformation of the above equation 1. The inverse transformation is a transformation for calculating the angle of rotation βn of the proximal side end link member 5 from the bending angle θ (FIG. 4) and the angle of traverse φ (FIG. 4).

After the control target value of the angle of rotation βn has been calculated, feedback control is performed on each of the two actuators 53 such that the angle of rotation βn approaches the control target value, by utilizing a signal from a posture detecting unit 59 for detecting the posture of the distal end side link hub 3. In the example shown in FIG. 1, the posture detecting unit 59 detects the angle of rotation βn (β1 and β2 shown in FIG. 4) of the proximal side end link member 5. The bending angle θ and the angle of traverse φ have a mutual relationship with the angle of rotation βn, and from one value, the other value can be obtained.

As described above, by controlling the rotation drive of each of the two actuators 53, the position and posture of the distal end side link hub 3 relative to the proximal end side link hub 2 is determined. Since only two of the three link mechanisms 4 are respectively provided with the actuators 53, it is sufficient to control only the two actuators 53. Compared with the case where all of the three link mechanisms 4 are respectively provided with the actuators 53, smooth operation of the actuators 53 are allowed, and a fast operation speed is realized.

Figure 11:
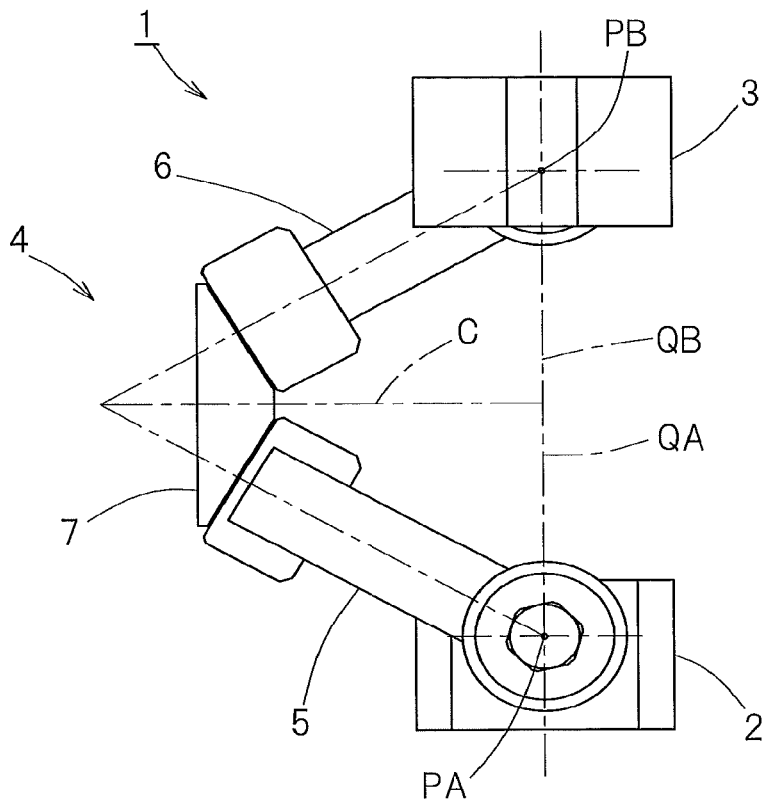
FIG. 11 is a front view of a parallel link mechanism of a link actuating device, with a portion thereof omitted, according to a second embodiment of the present invention.
Figure 12:
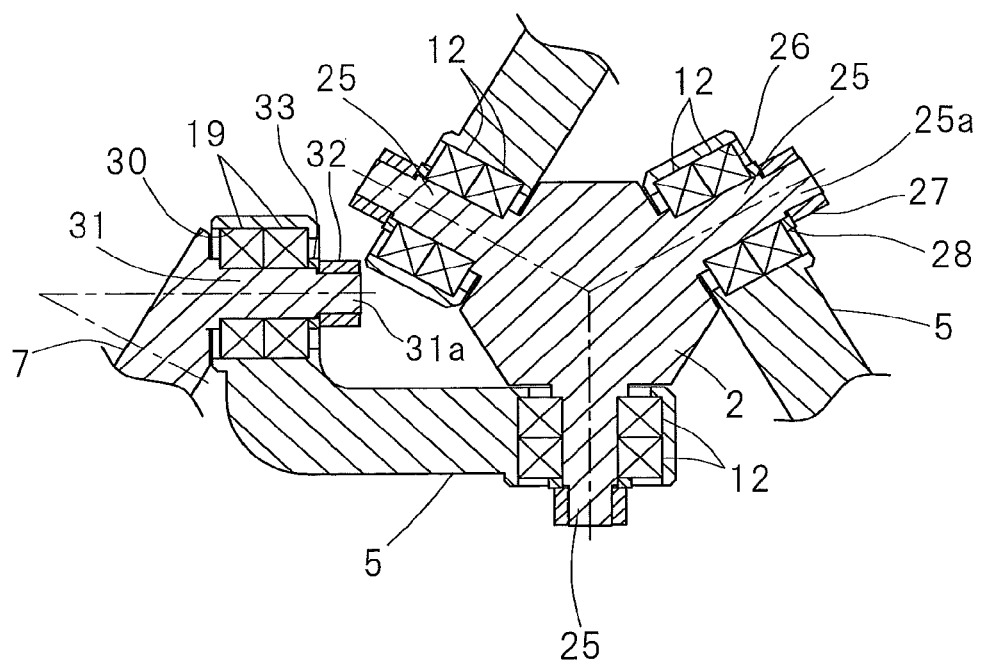
FIG. 12 is a sectional view of a portion of the parallel link mechanism.

FIG. 11 and FIG. 12 show a second embodiment of the present invention in which a different type of the parallel link mechanism is used. This parallel link mechanism 1 has the bearings 12 (FIG. 12), of an outer ring rotation type, which rotatably support each proximal side end link member 5 relative to the proximal end side link hub 2 and each distal side end link member 6 relative to the distal end side link hub 3. The revolute pair section between the proximal end side link hub 2 and the proximal side end link member 5 is explained as an example. As shown in FIG. 12, the proximal end side link hub 2 has shaft portions 25 formed at three positions in the circumferential direction thereof. The double row bearings 12 have inner rings (not shown) mounted on the outer periphery of each shaft portion 25, and outer rings (not shown) mounted on the inner periphery of a communication hole 26 formed in each proximal side end link member 5. Through fastening with a nut 27 threadedly engaged on a distal end screw portion 25a of the shaft portion 25, a predetermined preload amount is applied to the bearings 12 via a spacer 28. The revolute pair section between the distal end side link hub 3 and the distal side end link member 6 also has the same structure as that described above.

In the example shown, with respect to each bearing 19 supporting the intermediate link member 7 relative to the proximal side end link member 5, the bearing 19 has an outer ring (not shown) fitted on the inner periphery of a communication hole 30 formed at the distal end of the proximal side end link member 5, and an inner ring (not shown) fitted on the outer periphery of a shaft portion 31 integrally provided with the intermediate link member 7. Through fastening with a nut 32 threadedly engaged on a distal end screw portion 31a of the shaft portion 31, a predetermined preload amount is applied to the bearing 19 via a spacer 33. The revolute pair section between the distal side end link member 6 and the intermediate link member 7 also has the same structure as that described above. As is the case with the first embodiment above, this parallel link mechanism 1 also uses the bearing 12, 19 whose critical oscillation angle η is smaller than the maximum bending angle $\theta_{max}$.

Figure 13:
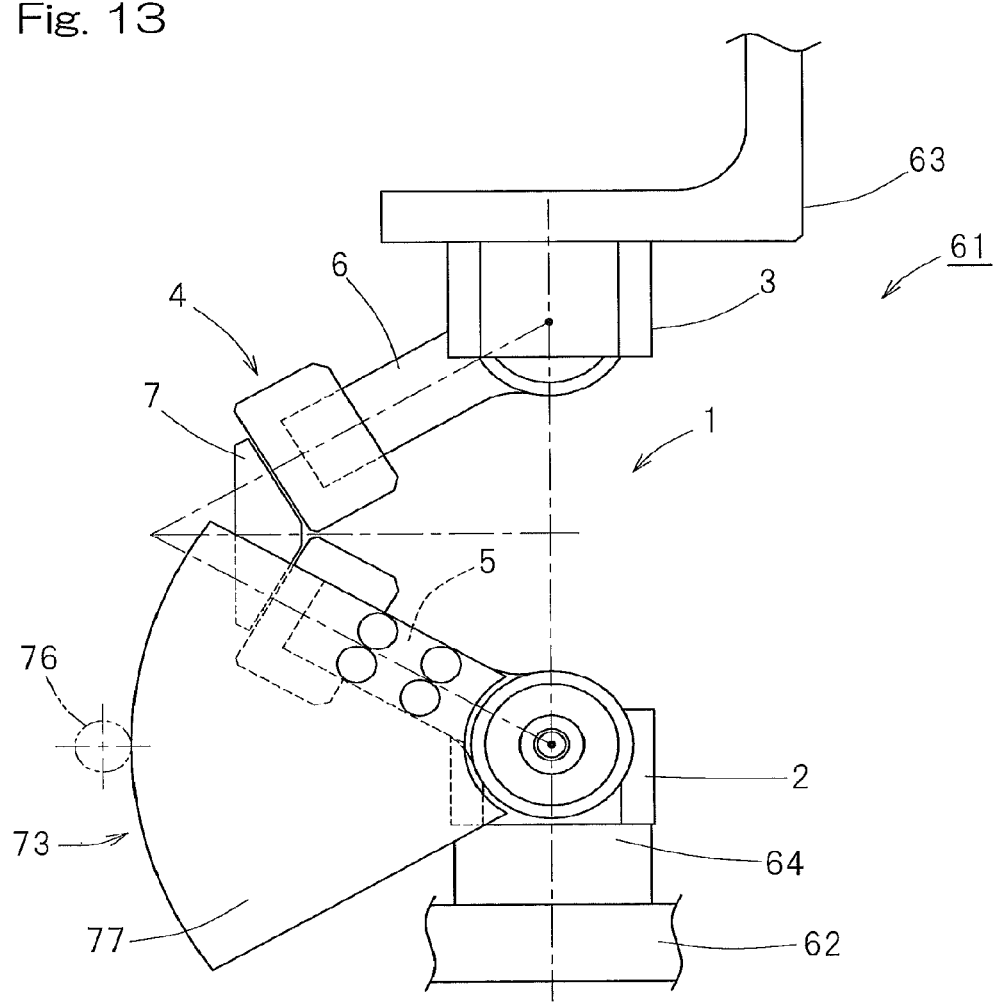
FIG. 13 is a front view of a link actuating device, with a portion thereof omitted, according to a third embodiment of the present invention.
Figure 14:
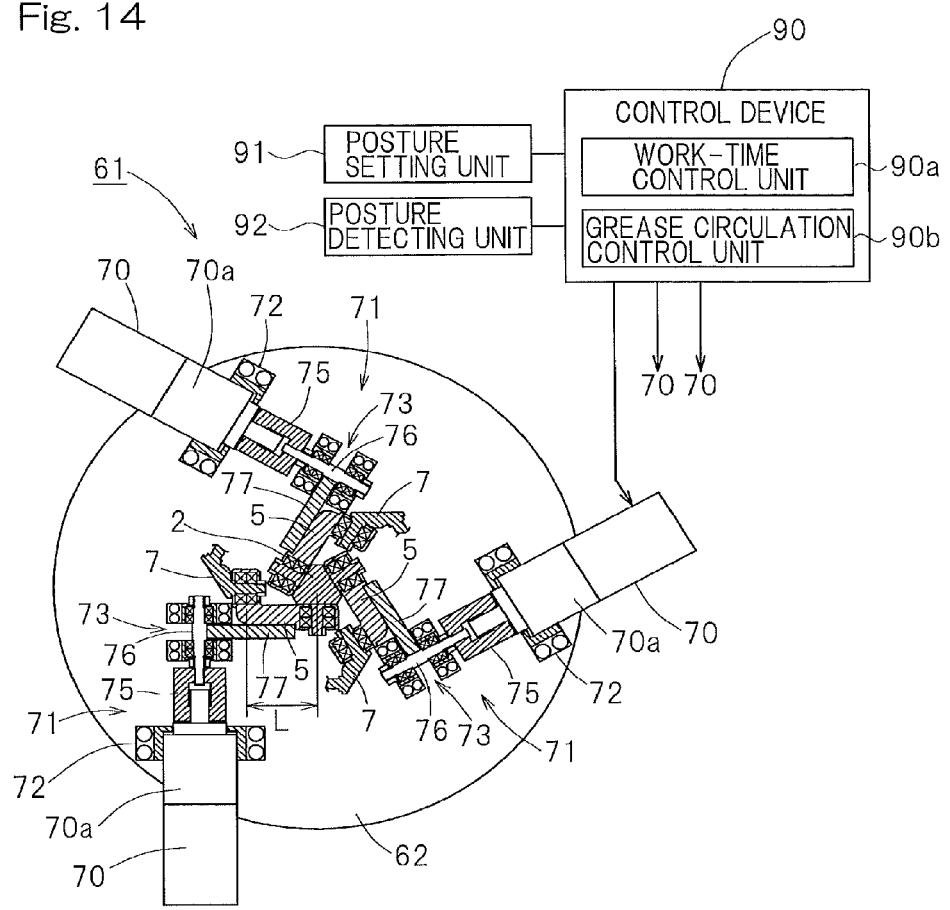
FIG. 14 is a sectional view of a portion of the link actuating device.
Figure 15:
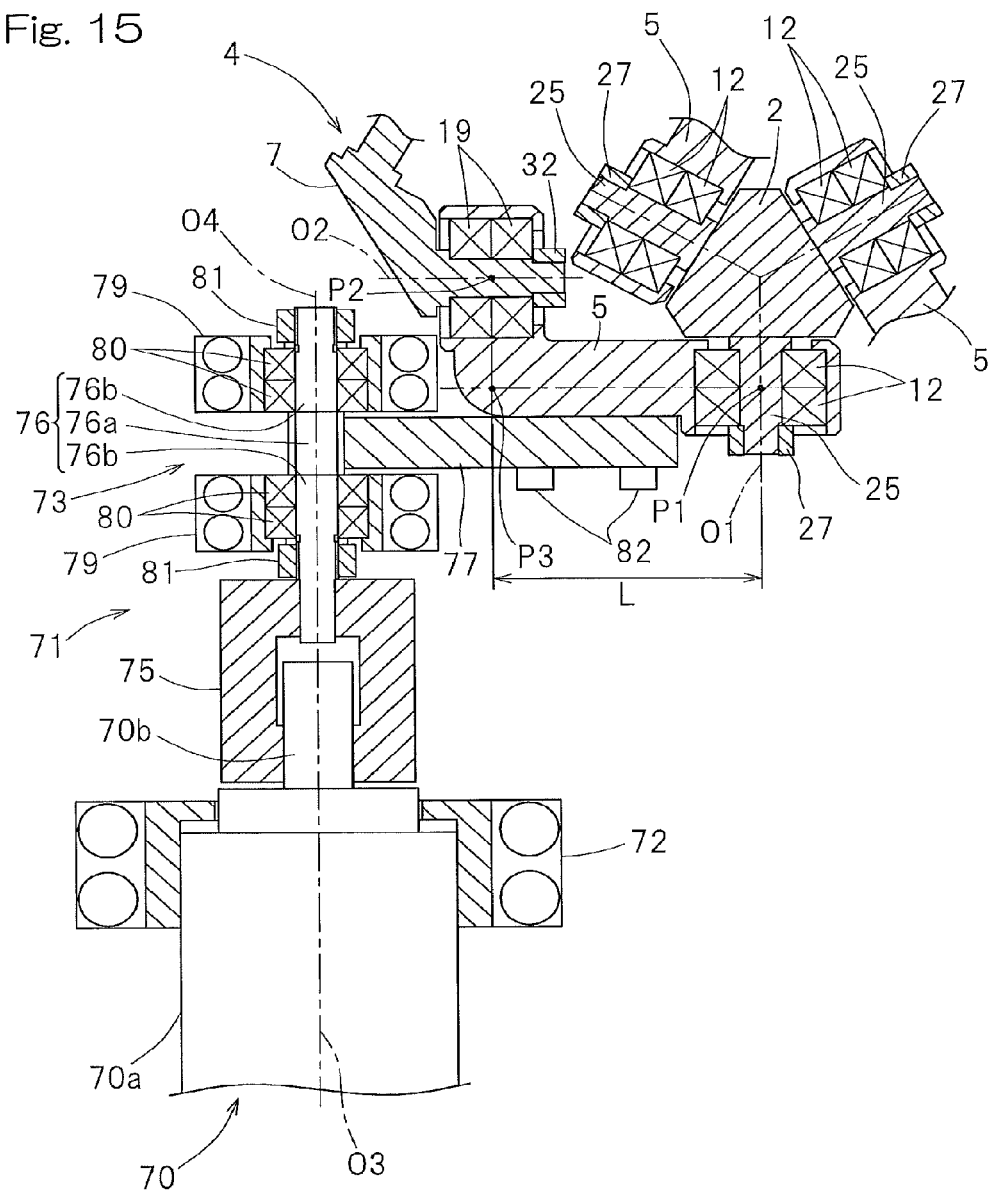
FIG. 15 is a partial enlarged view of FIG. 14.

FIG. 13 to FIG. 15 show a link actuating device according to a third embodiment of the present invention. In FIG. 13, this link actuating device 61 is of a type in which a distal end mounting member 63, on which a various type of instrument or the like is mounted, is connected to a base 62 via the parallel link mechanism 1 shown in FIG. 11 and FIG. 12, such that alteration in posture is allowed. Between the base 62 and the proximal end side link hub 2 of the parallel link mechanism 1, a spacer 64 is interposed.

As shown in FIG. 14 and FIG. 15 being a partial enlarged view of FIG. 14, at least two of the three link mechanisms 4 of the parallel link mechanism 1 are each provided with an actuator 70 which arbitrarily alters the posture of the distal end side link hub 3 relative to the proximal end side link hub 2 by rotating its corresponding proximal side end link member 5, and a reduction gear unit 71 which transmits the amount of operation of the actuator 70 to the proximal side end link member 5 after reducing the speed thereof. In the example shown, all of the three link mechanisms 4 are each provided with the actuator 70 and the reduction gear unit 71.

The actuator 70 is a rotary actuator, more specifically, a servomotor equipped with a reduction gear 70a, and is fixed to the base 62 by means of a motor fixing member 72. The reduction gear unit 71 includes the reduction gear 70a of the actuator 70 and a gear type speed reducing section 73.

The gear type speed reducing section 73 includes a small gear 76 connected to an output shaft 70b of the actuator 70 via a coupling 75 in a rotation transmittable manner, and a large gear 77 fixed to the proximal side end link member 5 and meshed with the small gear 76. In the example shown, the small gear 76 and the large gear 77 are each a spur gear, and the large gear 77 is a sector gear having gear teeth formed only on a peripheral surface of the arc portion thereof. The large gear 77 has a radius of pitch circle greater than that of the small gear 76, and the rotation of the output shaft 70b of the actuator 70 is transmitted to the proximal side end link member 5 after the rotation has been reduced in speed and made into rotation about a rotation axis O1 of the revolute pair between the proximal end side link hub 2 and the proximal side end link member 5. The speed reduction ratio is set to be 10 or higher.

The radius of the pitch circle of the large gear 77 is set to be greater than or equal to ½ of an arm length L of the proximal side end link member 5. The arm length L is the distance from an axial center point P1 of a central axis O1 of the revolute pair between the proximal end side link hub 2 and the proximal side end link member 5 to a point P3, the point P3 being obtained by projecting an axial center point P2 of a central axis O2 of the revolute pair between the proximal side end link member 5 and the intermediate link member 7 onto a plane that is orthogonal to the axis O1 of the revolute pair between the proximal end side link hub 2 and the proximal side end link member 5 and that passes through the axial center point P1. In the case of this embodiment, the radius of the pitch circle of the large gear 77 is greater than or equal to the arm length L, which is advantageous for obtaining a high speed reduction ratio.

The small gear 76 has a tooth portion 76a meshed with the large gear 77 and shank portions 76b protruding towards opposite sides of the tooth portion 76a. Each shank portion 76b is rotatably supported by double row bearings 80 provided on a corresponding one of rotation support members 79 disposed on the base 62. Each bearing 80 is a ball bearing such as, for example, a deep groove ball bearing or an angular contact ball bearing. Other than the double row ball bearings as in the example shown, a roller bearing and/or a slide bearing may be employed. The outer rings (not shown) of the respective double row bearings 80 have a shim (not shown) disposed therebetween, and by fastening a nut 81 threadedly engaged on the shank portion 76b, a preload is applied to each bearing 80. The outer ring of the bearing 80 is press-fixed into the rotation support member 79.

In the case of the third embodiment, the large gear 77 is a member separate from the proximal side end link member 5, and is removably mounted on the proximal side end link member 5 by means of connecting members 82 such as bolts or the like. The large gear 77 may be provided integrally with the proximal side end link member 5.

A rotation axis O3 of the actuator 70 and a rotation axis O4 of the small gear 76 lie on the same axis. These rotation axes O3 and O4 are set to be parallel to the axis O1 of the revolute pair between the proximal end side link hub 2 and the proximal side end link member 5, and at the same level in height from the base 62.

As shown in FIG. 14, each actuator 70 is controlled by a control device 90. The control device 90 is of a type capable of being numerically controlled by a computer, and includes a work-time control unit 90a and a grease circulation control unit 90b. The work-time control unit 90a and the grease circulation control unit 90b respectively perform the same controls as those performed by the work-time control unit 58a and the grease circulation control unit 58b in the first and second embodiments above.

The control device 90 of the third embodiment provides each actuator 70 with an output command based on a signal from a posture setting unit 91, which sets a posture of the distal end side link hub 3 relative to the proximal end side link hub 2, and a signal from a posture detecting unit 92, which detects the posture of the distal end side link hub 3 relative to the proximal end side link hub 2. The posture setting unit 91 sets the posture of the distal end side link hub 3, by specifying, for example, the bending angle θ (FIG. 4) and the angle of traverse φ (FIG. 4). The posture detecting unit 92 detects the angle of rotation βn (β1 and β2 in FIG. 4) of each proximal side end link member 5 by means of, for example, an encoder (not shown). Alternatively, an encoder (not shown) of the actuator 70 may be used for detecting the posture of the distal end side link hub 3. The bending angle θ and the angle of traverse φ have a mutual relationship with each angle of rotation βn, and from one value, the other value can be obtained.

In a case where the posture of the distal end side link hub 3 is to be altered relative to the proximal end side link hub 2, a control target value of the angle of rotation βn of each proximal side end link member 5 is calculated in accordance with the posture of the distal end side link hub 3 set by the posture setting unit 91. The angle of rotation βn above means the operating position of the actuator 70. The calculation of the angle of rotation βn is carried out by inverse transformation of the above equation 1. The inverse transformation is a transformation for calculating the angle of rotation βn of the proximal side end link member 5 from the bending angle θ and the angle of traverse φ.

After the control target value of the angle of rotation βn has been calculated, by a feedback control utilizing the signal from the posture detecting unit 92, an output of each actuator 70 is controlled such that the actual angle of rotation βn approaches the control target value. Accordingly, the proximal side end link members 5 of all of the link mechanisms 4 are each rotated by the determined angle of rotation βn, thereby causing the distal end side link hub 3 to assume the posture set by the posture setting unit 91.

Despite the compactness in size, the link actuating device 61 can have a wide range of movement of the distal end side link hub 3 relative to the proximal end side link hub 2. Thus, operability of a medical instrument or the like mounted on the distal end mounting member 63 is good. Since all of the three link mechanisms 4 are each provided with the actuator 70 and the reduction gear unit 71, drive can be realized in good balance no matter what posture is taken by the distal end side link hub 3 relative to the proximal end side link hub 2. In other words, the balance of driving force is good. Accordingly, each of the actuators 70 can be made compact in size. Also, the provision of the actuator 70 and the reduction gear unit 71 in all of the three link mechanisms 4 makes it possible to perform control such that rattling of the parallel link mechanism 1 and/or the reduction gear unit 71 can be cut down. Thus, the positioning accuracy of the distal end side link hub 3 can be increased, and also, the link actuating device 61 itself can have a high rigidity.

The gear type speed reducing section 73 of the reduction gear unit 71 includes a combination of the small gear 76 and the large gear 77, and is capable of providing the high speed reduction ratio of 10 or higher. If the speed reduction ratio is high, the positioning resolution of the encoder or the like is rendered to be high, and therefore, the positioning resolution of the distal end side link hub 3 increases. Also, the actuator 70 of a low output can be used. In this third embodiment, although the actuator 70 with the reduction gear 70a is used, use of the gear type speed reducing section 73 having high speed reduction ratio makes it possible to use the actuator 70 having no reduction gear, and as a result, the actuator 70 can be made compact in size.

Since the radius of the pitch circle of the large gear 77 is set to be greater than or equal to ½ of the arm length L of the proximal side end link member 5, the bending moment of the proximal side end link member 5, which is caused by a distal end loading, is rendered to be small. For this reason, the rigidity of the link actuating device 61 as a whole can be maintained at a value not higher than necessary, and also the weight of the proximal side end link member 5 can be reduced. For example, the material of the proximal side end link member 5 can be changed from stainless steel (SUS) to aluminium. Also, since the radius of the pitch circle of the large gear 77 is relatively large, the surface pressure of a tooth portion of the large gear 77 decreases and the rigidity of the link actuating device 61 as a whole increases.

Further, if the radius of the pitch circle of the large gear 77 is greater than or equal to ½ of the arm length L, the large gear 77 comes to have a sufficiently larger diameter than the outer diameter of each bearing 12 that is disposed at the revolute pair section between the proximal end side link hub 2 and the proximal side end link member 5. Accordingly, space is created between the tooth portion of the large gear 77 and the bearing 12, and thus, the large gear 77 is easy to be disposed.

Particularly in the case of the third embodiment, since the radius of the pitch circle of the large gear 77 is greater than or equal to the arm length L, the radius of the pitch circle of the large gear 77 is further increased, and operations and effects are further remarkably exhibited. In addition, it is possible to dispose the small gear 76 on the outer diameter side relative to the link mechanism 4. As a result, the space for installing the small gear 76 can be easily secured and the degree of freedom of designing increases. Also, the interference between the small gear 76 and any other member will hardly occur, and the range of movement of the link actuating device 61 expands.

Since the small gear 76 and the large gear 77 are each a spur gear, the manufacture thereof is easy and the transmission efficiency of rotation is high. Since the small gear 76 is supported by the bearings 80 on axially opposite sides, the support rigidity of the small gear 76 is high. Accordingly, the angle retaining rigidity of the proximal side end link member 5 under the distal end loading increases, and as a result, increase of the rigidity and the positioning accuracy of the link actuating device 61 cab be achieved. Also, since the rotation axis O3 of the actuator 70, the rotation axis O4 of the small gear 76 and the central axis O1 of the revolute pair between the proximal end side link hub 2 and the proximal side end link member 5 lie on the same plane, the overall balance is good and the assemblability is also good.

Since the large gear 77 is removable from the proximal side end link member 5, change in specification such as, for example, the speed reduction ratio of the gear type speed reducing section 73 and the range of operation of the distal end side link hub 3 relative to the proximal end side link hub 2 is rendered to be easy, and the mass productivity of the link actuating device 61 increases, accordingly. In other words, the common link actuating device 61 can be applied to various applications merely by changing the large gear 77. Moreover, the maintenance is good. For example, when any trouble occurs in the gear type speed reducing section 73, replacement of only the gear type speed reducing section 73 is enough.

As described above, although the preferred embodiments and application embodiments have been described with reference to the accompanying drawings, those skilled in the art will readily conceive numerous changes and modifications within the framework of obviousness upon the reading of the specification herein presented of the present invention. Accordingly, such changes and modifications are to be construed as included in the scope of the present invention as delivered from the claims annexed hereto.

REFERENCE NUMERALS

2 . . . proximal end side link hub
3 . . . distal end side link hub
4 . . . link mechanism
5 . . . proximal side end link member
6 . . . distal side end link member
7 . . . intermediate link member
12, 19 . . . bearing
12a, 19a . . . rolling element
51, 61 . . . link actuating device
53, 70 . . . actuator
58, 90 . . . control device
QA . . . central axis of proximal end side link hub
QB . . . central axis of distal end side link hub
$\theta_{max}$ . . . maximum value of bending angle in work-time control
$\theta'_{max}$ . . . maximum allowable bending angle

What is claimed is:

1. A link actuating device comprising:
a proximal end side link hub;
a distal end side link hub; and
three or more link mechanisms connecting the distal end side link hub to the proximal end side link hub,
wherein each of the link mechanisms includes
a proximal side end link member having one end rotatably connected to the proximal end side link hub;
a distal side end link member having one end rotatably connected to the distal end side link hub; and
an intermediate link member having one end and the other end rotatably connected to the other ends of the proximal side end link member and the distal side end link member, respectively,
wherein each of the link mechanisms has such a shape that a geometric model of the link mechanism depicted in lines shows symmetry between a proximal end side portion thereof and a distal end side portion thereof with respect to an intermediate portion of the intermediate link member,
wherein at least two or more link mechanisms among the three or more link mechanisms are each provided with an actuator which arbitrarily alters a posture of the distal end side link hub relative to the proximal end side link hub,
wherein a revolute pair between the proximal end side link hub and the one end of the proximal side end link member, a revolute pair between the distal end side link hub and the one end of the distal side end link member, a revolute pair between the other end of the proximal side end link member and the one end of the intermediate link, and a revolute pair between the other end of the distal side end link member and the other end of the intermediate link each have a bearing interposed therein,
wherein a control device controls the actuator, the control device being configured to perform work-time control for causing a determined work operation to be executed and performing, while the work-time control is stopped, grease circulation control for circulating grease sealed in the bearing,
wherein a maximum value of a bending angle, in the work-time control, is an angle between a central axis of the proximal end side link hub and a central axis of the distal end side link hub that does not exceed a maximum allowable bending angle that is a maximum value of the bending angle allowable in each mechanism, and
wherein a maximum value of the bending angle in the grease circulation control is greater than the maximum value of the bending angle in the work-time control and smaller than the maximum allowable bending angle.

2. The link actuating device as claimed in claim 1, wherein in the grease circulation control, the control device controls the actuator to cause the distal end side link hub to swing relative to the proximal end side link hub while the bending angle is maintained to be greater than the maximum value of the bending angle in the work-time control.

3. The link actuating device as claimed in claim 1, wherein the bearing has a critical oscillation angle smaller than the maximum value of the bending angle in the work-time control.

4. The link actuating device as claimed in claim 1, wherein the bearing has a critical oscillation angle greater than the maximum value of the bending angle in the work-time control and smaller than the maximum allowable bending angle.

5. The link actuating device as claimed in claim 1, wherein the bearing interposed in each of the revolute pairs is a deep groove ball bearing, and when the number of rolling elements of the deep groove ball bearing is Z, a critical oscillation angle of the bearing is set to be $2 \times 180/(0.555Z\pi)$[deg].

6. The link actuating device as claimed in claim 1, wherein the bearing is a cylindrical roller bearing, and when the number of rolling elements in the cylindrical roller bearing is Z, a critical oscillation angle of the bearing is set to be $2 \times 180/(0.37(Z+0.1)\pi)$[deg].

7. The link actuating device as claimed in claim 1, wherein the bearing is a needle roller bearing, and when the number of rolling elements in the needle roller bearing is Z, a critical oscillation angle of the bearing is set to be $2 \times 180/(0.544Z\pi)$[deg].

* * * * *